Patented June 3, 1930

1,761,057

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

COMPOSITION OF MATTER

No Drawing. Original application filed August 26, 1927, Serial No. 215,767. Divided and this application filed February 18, 1928. Serial No. 255,497.

This application is a division of my original application No. 215,767, filed August 26, 1927.

The invention relates to compositions of matter, and its object is to provide a novel composition, which can be used for friction brakes and for other purposes, which can be readily and easily prepared and formed to shapes desired for different uses, including brakes, clutches and other mechanical devices wherein a braking or retarding effect is required, and which will produce a uniform and efficient braking resistance with relatively little wear and without being structurally affected by the heat of friction except at the contact surface.

My invention contemplates a mixture of asbestos and a carbonaceous material in a suitable form with a binder and in proportions which may be varied to secure desired results as hereinafter indicated.

I use fibrous asbestos because it bonds the mass together and is heat resistant. I recommend the use of short fiber asbestos for reasons of economy and because I have found it satisfactory for the purpose.

For the carbonaceous material I now prefer to use a coking coal, which will melt under heat, which will give up condensable gases to produce tarry or pitchy elements under continued heat, and which can be readily prepared in a satisfactory form and combined with the asbestos in a manner which I regard as best suited for forming the composition into shapes for use as brake blocks or into other shapes for other purposes.

I use a binder which has the property of enabling the composition to be reduced to a solid form, and for this purpose I prefer to use an oxidizing or drying oil.

The invention may be practiced for making friction blocks by providing short fiber asbestos, a carbonaceous material such as bituminous coal reduced to a finely divided condition, and double boiled linseed oil. I have used coal which will pass through a 20 mesh screen and finer coal. The asbestos and coal and linseed oil are mixed in a suitable mixer. The mixture is placed in a mold and is subjected to a sufficient pressure, say 2,000 pounds or more per square inch, to form a solid block, and the block is then placed in a drying oven and suitably cured. I consider it important that the carbonaceous material be in a finely divided condition and that it be distributed with a fair degree of uniformity throughout the mixture so that the wearing face of the block will be a composite of asbestos and carbonaceous material with the carbonaceous material distributed in a finely divided condition throughout the wearing surface at all times during the life of the block. An example of a composition which may be used, and one which I have found satisfactory, is as follows: equal parts of asbestos and bituminous coal, and ten per cent by weight of linseed oil. The proportions of the asbestos and bituminous coal may be varied to meet different requirements as to friction and durability.

When the brake block is pressed under braking pressure against a member to be braked, such as a drum, the air is excluded from the braking contact surface and the coal at the surface will become plastic at a temperature of approximately 540° to 720° F., which temperature is quickly reached in a friction brake. This plastic condition is sufficient for some braking. As the friction heat increases and the coal mass at the surface becomes substantially rigid, decomposition gases are produced. These gases are converted into a tarry or pitchy material which produces the desired condition for a higher degree of friction as required. This plastic zone consists of coal in the process of melting with tarry or pitchy material that is being distilled, and the thickness and nature of the zone depends upon the kind of coal used, the degree of fineness and the rate of temperature increase. The plastic zone is of very slight depth under all conditions, it travels inward of the block slowly and it forms an insulating shield or diaphragm which protects the coal beneath the plastic zone against the heat of friction. As the friction heat increases, or as the braking contact surface of the block wears away, the plastic zone travels inward of the block, but, as before stated, the rate of travel is slow, the plastic zone protects the interior of the block against the heat of friction, and the friction wear of the block under any ordinary brake application can hardly be detected. The gases and vapors are liberated on the drum side, which is the hot side, of the plastic zone, and the tarry material into which they are converted forms a thin film coating on the braking surface of the block and a most efficient braking element.

While I have referred to a coking coal as an example of a material which can be satisfactorily employed in my invention, I do not restrict myself thereto, but desire to use any carbonaceous or pyrobituminous material suitable for the purpose. A carbonaceous material, especially in a finely divided condition, has been found to be highly desirable as a frictional material because it contains the elements which are capable of producing a high degree of friction resistance, and because these elements are present in the carbonaceous material in a condition ready to be converted by the heat of friction to produce the friction resistance in the degree and as required for effective braking. The particles of carbonaceous material are distributed as uniformly as possible in the mixing operation throughout the body of the block, and they are supported and bonded together by the asbestos, as well as by the binder.

I have referred to the use of the composition in friction blocks for brakes, and in clutches, but it may be used in other devices and places where a braking, retarding or force dissipating effect is desired. To better adapt the composition for some purposes it may be desirable to vary the specific materials and proportions hereinbefore described and I reserve the right to make any such changes within the scope of the following claims.

I claim:

1. A friction composition for brakes and other purposes consisting of a mixture of a solid natural friction sustaining carbonaceous material, asbestos, and a binder.

2. A friction composition for brakes and other purposes consisting of a mixture of coal, asbestos, and a binder.

3. A friction composition for brakes and other purposes consisting of a mixture of bituminous coal, asbestos, and a binder.

4. A friction composition for brakes and other purposes consisting of a mixture of a solid natural friction sustaining carbonaceous material in a finely divided condition, asbestos, and a binder.

5. A friction composition for brakes and other purposes consisting of a mixture of finely divided natural friction sustaining carbonaceous material, asbestos, and linseed oil.

6. A friction composition for brakes and other purposes consisting of a mixture of natural friction sustaining carbonaceous material, asbestos, and a binder, the carbonaceous material being finely divided and substantially uniformly distributed throughout the composition.

7. A friction composition for brakes and other purposes consisting of a mixture of bituminous coal, asbestos, and a binder, the bituminous coal being finely divided and substantially uniformly distributed throughout the composition.

JAMES S. THOMPSON.